United States Patent
Deng

(10) Patent No.: US 12,107,614 B2
(45) Date of Patent: Oct. 1, 2024

(54) MOBILE TERMINAL PROTECTIVE CASE FOR DIVING

(71) Applicant: GUANGDONG XIZHONGXI TECHNOLOGY CO., LTD., Dongguan (CN)

(72) Inventor: Xiuhong Deng, Shaoyang (CN)

(73) Assignee: GUANGDONG XIZHONGXI TECHNOLOGY CO., LTD., Dongguan (CN)

( * ) Notice: Subject to any disclaimer, the term of this patent is extended or adjusted under 35 U.S.C. 154(b) by 451 days.

(21) Appl. No.: 17/575,667

(22) Filed: Jan. 14, 2022

(65) Prior Publication Data
US 2023/0231593 A1    Jul. 20, 2023

(51) Int. Cl.
*H04B 1/03* (2006.01)
*H04B 1/3888* (2015.01)

(52) U.S. Cl.
CPC ................................ *H04B 1/3888* (2013.01)

(58) Field of Classification Search
CPC ............. H04M 1/0243; H04M 1/0249; H04M 1/0206; H04M 1/0269; H04B 1/3888; H04B 1/03
See application file for complete search history.

(56) References Cited

U.S. PATENT DOCUMENTS

| 2014/0378193 | A1* | 12/2014 | Biancamano | ........ | H04B 1/3888 455/575.8 |
| 2016/0119014 | A1* | 4/2016 | Johnson | ................ | H04M 1/185 455/575.8 |
| 2021/0281764 | A1* | 9/2021 | Ma | ........................ | H04N 23/632 |

FOREIGN PATENT DOCUMENTS

| CN | 207360661 U | * | 5/2018 |
| CN | 215499145 U | * | 1/2022 |

* cited by examiner

*Primary Examiner* — Jinsong Hu
*Assistant Examiner* — Farideh Madani

(57) ABSTRACT

A mobile terminal protective case for diving includes an upper shell, a lower shell, a clamping assembly arranged in the accommodating cavity, and a positioning plate arranged in an accommodating cavity. The upper shell and the lower shell are closed together to form the accommodating cavity. Shooting control buttons triggering virtual shooting buttons of a mobile terminal are arranged on the upper shell. The clamping assembly clamps two opposite sides of the mobile terminal. By arranging the clamping assembly and the positioning plate in the accommodating cavity, not only storage of the mobile terminal of different models is realized, versatility is improved. By arranging the shooting control buttons, switching of different shooting nodes is realized, switching of using a front camera and using s rear camera is realized, and shooting control of the mobile terminals of different specifications is realized, which greatly improves user experience.

12 Claims, 7 Drawing Sheets

MOBILE TERMINAL PROTECTIVE CASE FOR DIVING

TECHNICAL FIELD

The present disclosure relates to a field of mobile phone accessories, and in particular to a mobile terminal protective case for diving.

BACKGROUND

Diving is an underwater activity. With improvements of diving facilities, more and more diving enthusiasts are choosing to dive under guidance of professionals to watch different scenery of the underwater world. In order to be able to capture different underwater landscapes, protective cases for mobile terminals such as tablets or mobile phones are created. Although a conventional mobile terminal protective case realizes underwater shooting of a mobile terminal, it is unable to meet general requirements of mobile terminals of different specifications and models, resulting in insufficient versatility of the protective cases, and reducing user experience.

SUMMARY

In view of this, it is necessary to provide a universal mobile terminal protective case so that a user can place mobile terminals of different specifications in the protective case for underwater shooting.

The present disclosure provides a mobile terminal protective case for diving. The mobile terminal protective case for diving comprises a shell, a clamping assembly, and a positioning plate. The shell comprises an upper shell and a lower shell. The upper shell and the lower shell are closed together to form an accommodating cavity. The accommodating cavity is sealed and is configured to accommodate the mobile terminal. Shooting control buttons are arranged on the upper shell. The shooting control buttons are configured to trigger virtual shooting buttons of the mobile terminal. A shooting window is on the lower shell. The clamping assembly is arranged in the accommodating cavity. The clamping assembly clamps two opposite sides of the mobile terminal from a first direction. The positioning plate is movably arranged in the accommodating cavity. The positioning plate is configured as a positioning substrate for the mobile terminal in a second direction.

When the mobile terminal of different models is clamped by the clamping assembly, the positioning plate is adjusted to position the second direction of the mobile terminal, so the virtual shooting buttons of the mobile terminal directly face the shooting control buttons and a rear camera of the mobile terminal faces the shooting window. The first direction is different with the second direction.

Compared with the prior art, in the present disclosure, by arranging the clamping assembly that is adjustable in the accommodating cavity, the first direction of the mobile terminal is fixed, which prevents the mobile terminal from shaking from side to side. By movably arranging the positioning plate in the accommodating cavity and configuring the positioning plate as the positioning substrate of the mobile terminal in the second direction. When the mobile terminal of different models is clamped by the clamping assembly, the virtual shooting buttons of the mobile terminal directly face the shooting control buttons, and the rear camera of the mobile terminal directly faces the shooting window.

In the present disclosure, by arranging the clamping assembly and the positioning plate in the accommodating cavity, not only storage of the mobile terminal of different models is realized, versatility of the mobile terminal protective case for driving is improved, and shooting control of the mobile terminals of different specifications is realized, which greatly improves user experience.

DETAILED DESCRIPTION

Figure 1:
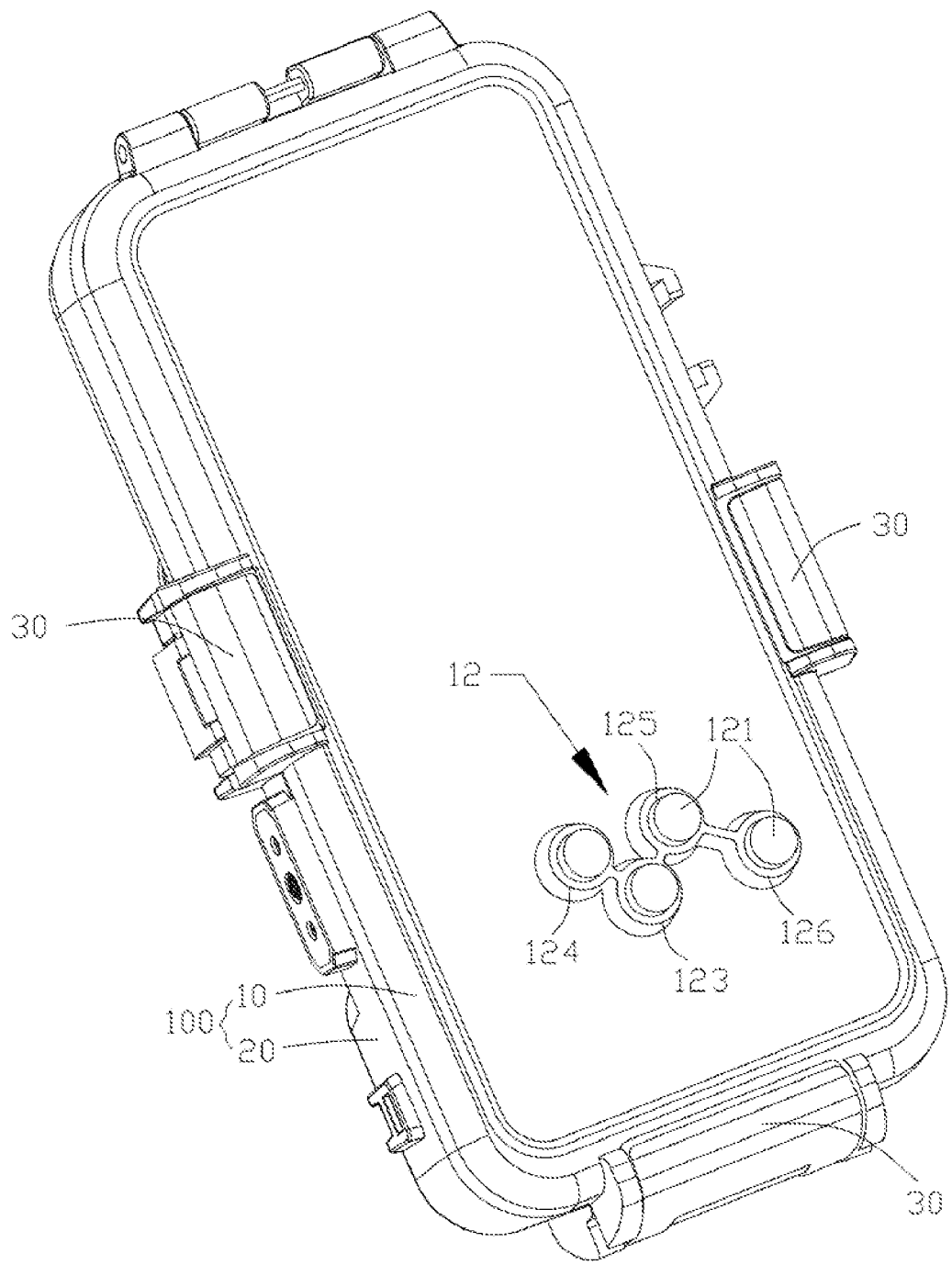
FIG. 1 is a schematic diagram showing an overall structure of a mobile terminal protective case for diving according to one embodiment of the present disclosure.

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. It is understood that the drawings are only provided for reference and illustration, and are not used to limit the present disclosure. The connection relationship shown in the drawings is only for the convenience of clear description, and does not intend to limit the connection mode.

It should be noted that when a component is considered to be "connected" to another component, it can be directly connected to another component, or there may be a centered component at the same time. Unless otherwise defined, all technical and scientific terms used herein have the same meaning as commonly understood by those skilled in the art of the present disclosure. It should be noted in the description of the present disclosure that, unless otherwise regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present disclosure may be understood according to concrete conditions.

In addition, it should be noted that in the description of the present disclosure terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, terms such as "first", "second", and "third" are only used for the purpose of description, rather than being understood to indicate or imply relative importance.

Figure 2:
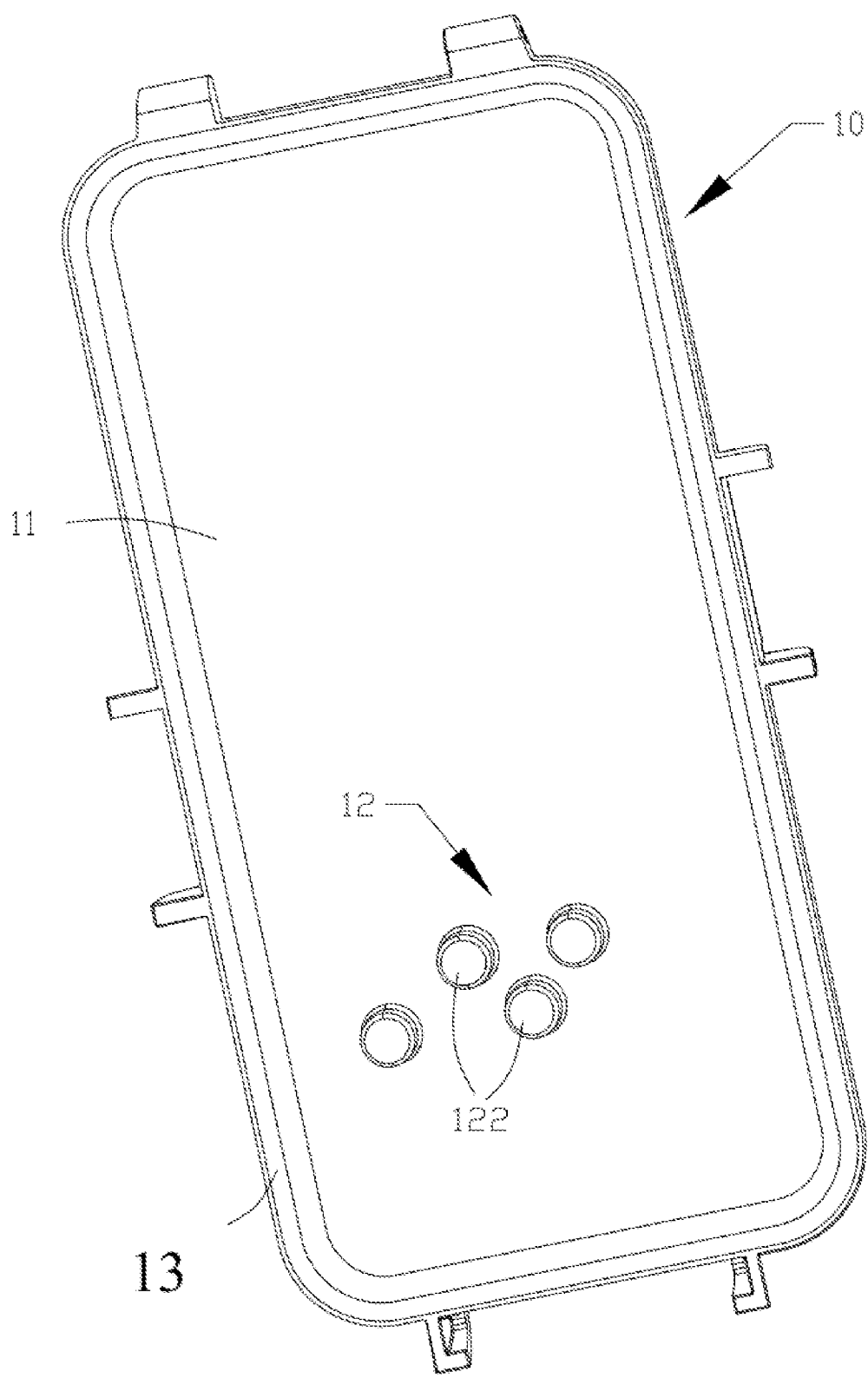
FIG. 2 is a schematic diagram of an upper hosing according to one embodiment of the present disclosure.
Figure 3:
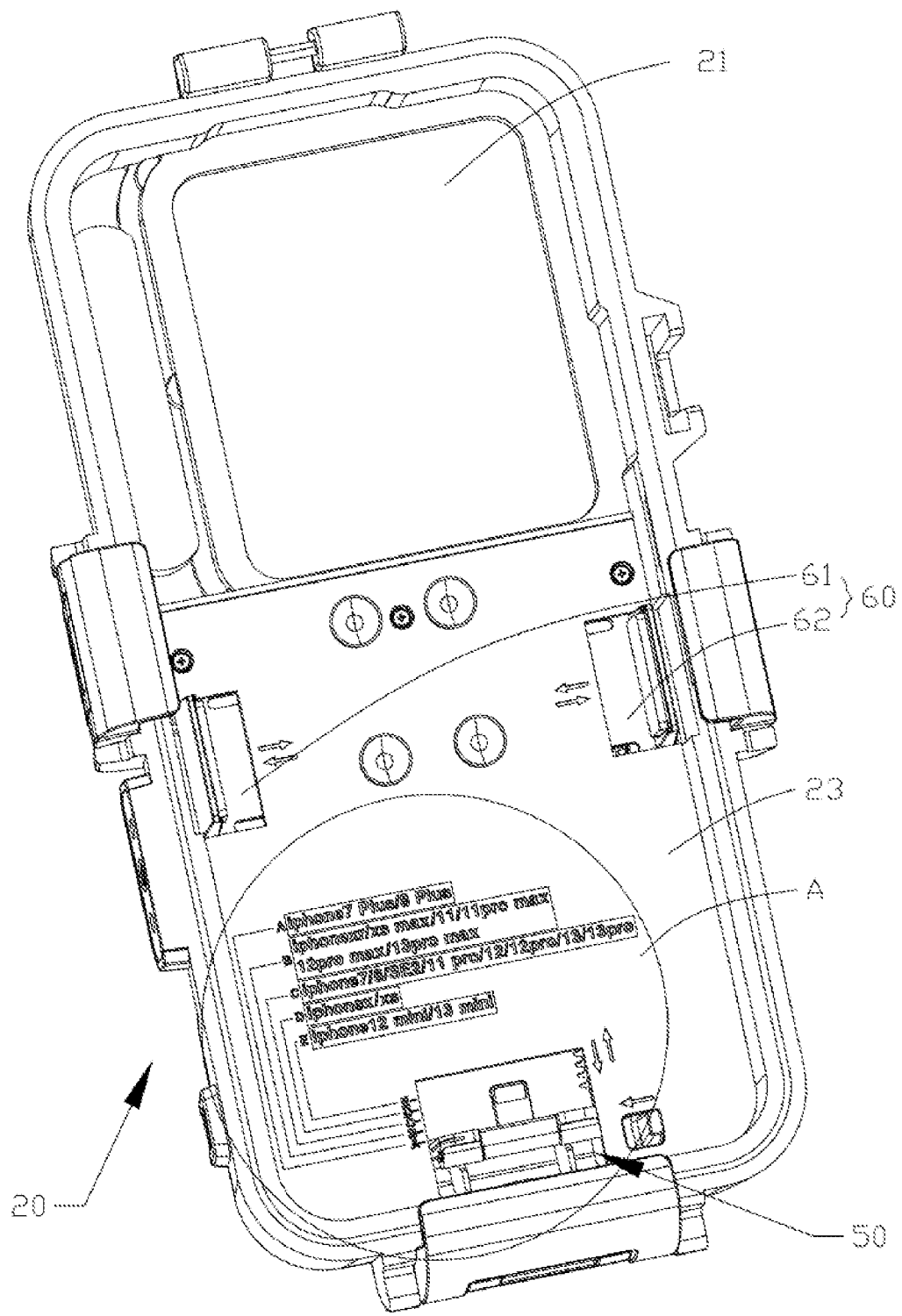
FIG. 3 is a schematic diagram of a lower hosing according to one embodiment of the present disclosure.

As shown in FIGS. 1-3, the present disclosure provides a mobile terminal protective case for diving. The mobile terminal protective case for diving comprises a shell 100, an adjusting assembly 50, and a clamping assembly 60. The shell 100 comprises an upper shell 10 and a lower shell 20. The upper shell 10 and the lower shell 20 are closed together to form an accommodating cavity (not marked in the drawings). The accommodating cavity is sealed and is configured to accommodate a mobile terminal.

The shell 100 has a rectangular parallelepiped structure. A sealing ring 13 is arranged on a closed end surface of the upper shell 10 or a closed end surface of the lower shell 20. One side of the upper shell 10 is hinged to one side of the lower shell 20. Other sides of the upper shell 10 are fixed with other sides of the lower shell 20 by buckles 30. After the upper shell 10 is snapped on the lower shell 20, under action of the sealing ring 13, the accommodating cavity formed between the upper shell 10 and the lower shell 20 is sealed, so that the mobile terminal protective case has a good waterproof effect during diving.

The upper shell 10 comprises a transparent window 11, and an area of the transparent window 11 is not less than a display interface of the mobile terminal, so a user views the display interface of the mobile terminal completely. Shooting control buttons 12 are arranged on the transparent window 11. The shooting control buttons 12 directly face the display interface of the mobile terminal. The shooting control buttons 12 comprise pressing surfaces 121 and triggering surfaces 122. The triggering surfaces 122 directly face virtual shooting buttons of the mobile terminal. When the pressing surface 121 are pressed, the triggering surfaces 122 trigger the virtual shooting buttons.

The shooting control buttons 12 comprise a shooting button 123, a first switching button 124, a second switching button 125, and a third switching button 126. The shooting button 123 is configured to control photographing or video shooting. The first switching button 124 is configured to switch a shooting mode from a left direction. The second switching button 125 is configured to switch the shooting mode from a right direction. The third switching button 126 is configured to switch between using a front camera and using the rear camera. Therefore, the user is able to control the display interface of the mobile terminal through the shooting control buttons 12, which greatly improves the user experience.

A shooting window 21 is on the lower shell 20. The shooting window 21 is a large area window. When the mobile terminal has different models is received in the accommodating cavity, the rear camera of the mobile terminal always directly faces the shooting window 21, so pictures are taken through the shooting window 21.

The clamping assembly 60 is arranged in the accommodating cavity. The clamping assembly 60 clamps two opposite sides of the mobile terminal from a first direction. The adjusting assembly 50 comprises a positioning plate 51. The positioning plate 51 is movably arranged in the accommodating cavity. The positioning plate 51 is configured as a positioning substrate for the mobile terminal in a second direction.

When the mobile terminal of different models is clamped by the clamping assembly, by adjusting the positioning plate 51, the mobile terminal is positioned from the second direction, so the virtual shooting buttons of the mobile terminal directly face the shooting control buttons 12 and the rear camera of the mobile terminal faces the shooting window 21. Optionally, the shooting window 21 is arranged on a side away from the positioning plate 51, In the embodiment, the first direction is perpendicular to the second direction. The first direction is a horizontal direction, and the second direction is a vertical direction.

Figure 4:
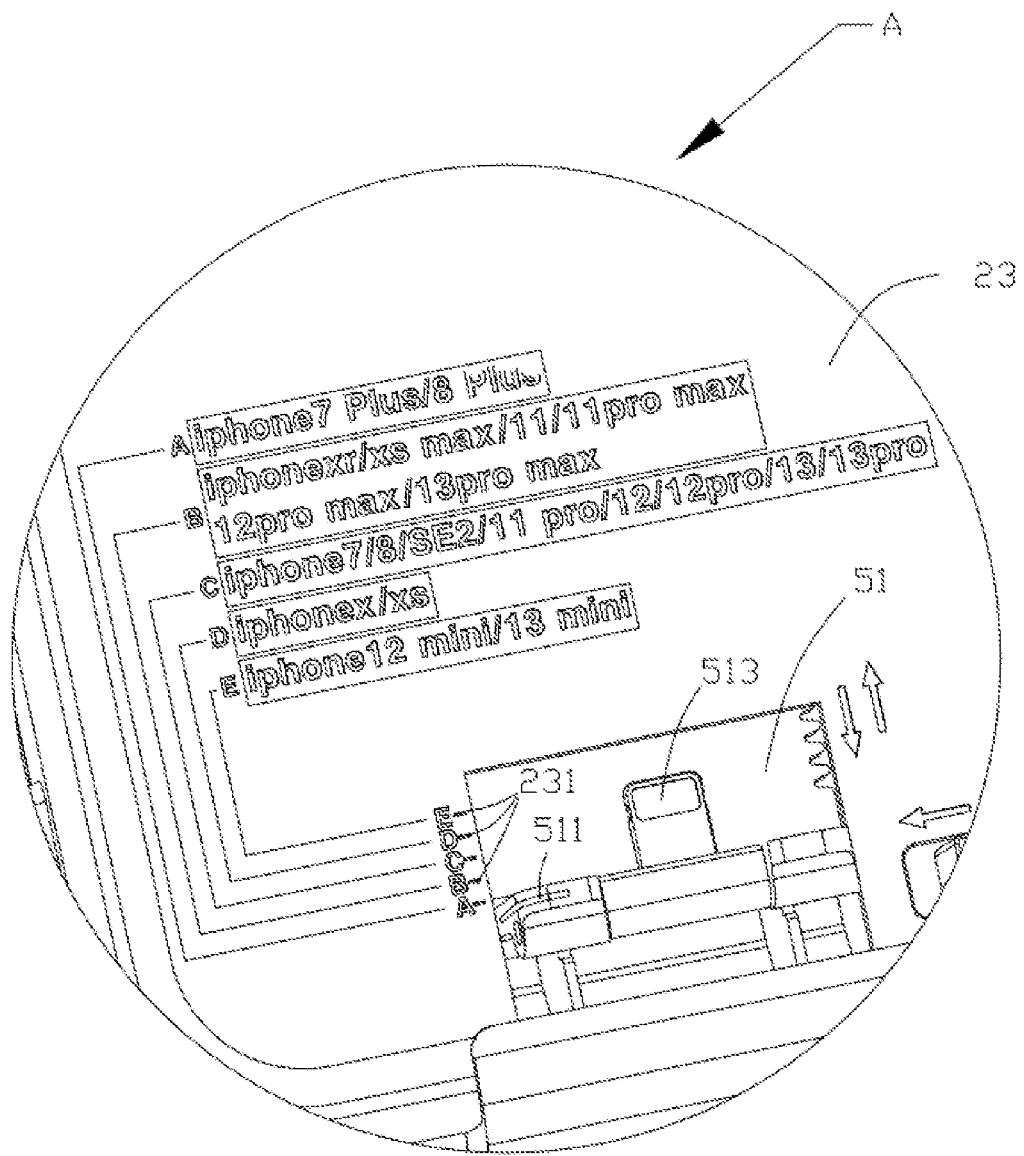
FIG. 4 is an enlarged schematic diagram of area A shown in FIG. 3.

As shown in FIG. 4, a datum line 511 is provided on one side of the positioning plate 51. The datum line 511 is perpendicular to a sliding direction of the positioning plate 51. The datum line 511 extends upward along one side of the positioning plate 51 to an upper surface of the positioning plate 51. The lower shell 20 comprises a bottom plate 23. A plurality of reference lines 231 separately corresponding to the positioning plates are provided on the bottom plate 23 of the lower shell 20. Each of the plurality of reference lines 231 corresponds to a model of the mobile terminal, which allows the user to align the datum line 511 with the plurality of reference line 231 when adjusting a position of the positioning plate 51, so the user is able to know exactly what type of mobile terminal the positioning plate 51 is used to position at this time.

The plurality of reference line 231 are arranged on an upper surface of the bottom plate 23 parallel to the datum line 511 and along the sliding direction of the positioning plate 51. The plurality of reference lines 231 are arranged parallel to each other. Each of the plurality of reference lines 231 are respectively marked in order. Descriptions of commonly used mobile terminals are grouped by model in a blank area on the upper surface of the bottom plate 23, and each group corresponds to a corresponding reference line 231. Therefore, the user quickly adjusts and positions the mobile terminal according to a model of the mobile terminal, the plurality of reference line 231, and the datum line 511, which further improves adjustment efficiency when using the mobile terminal protective case and enhances the use experience.

Figure 5:
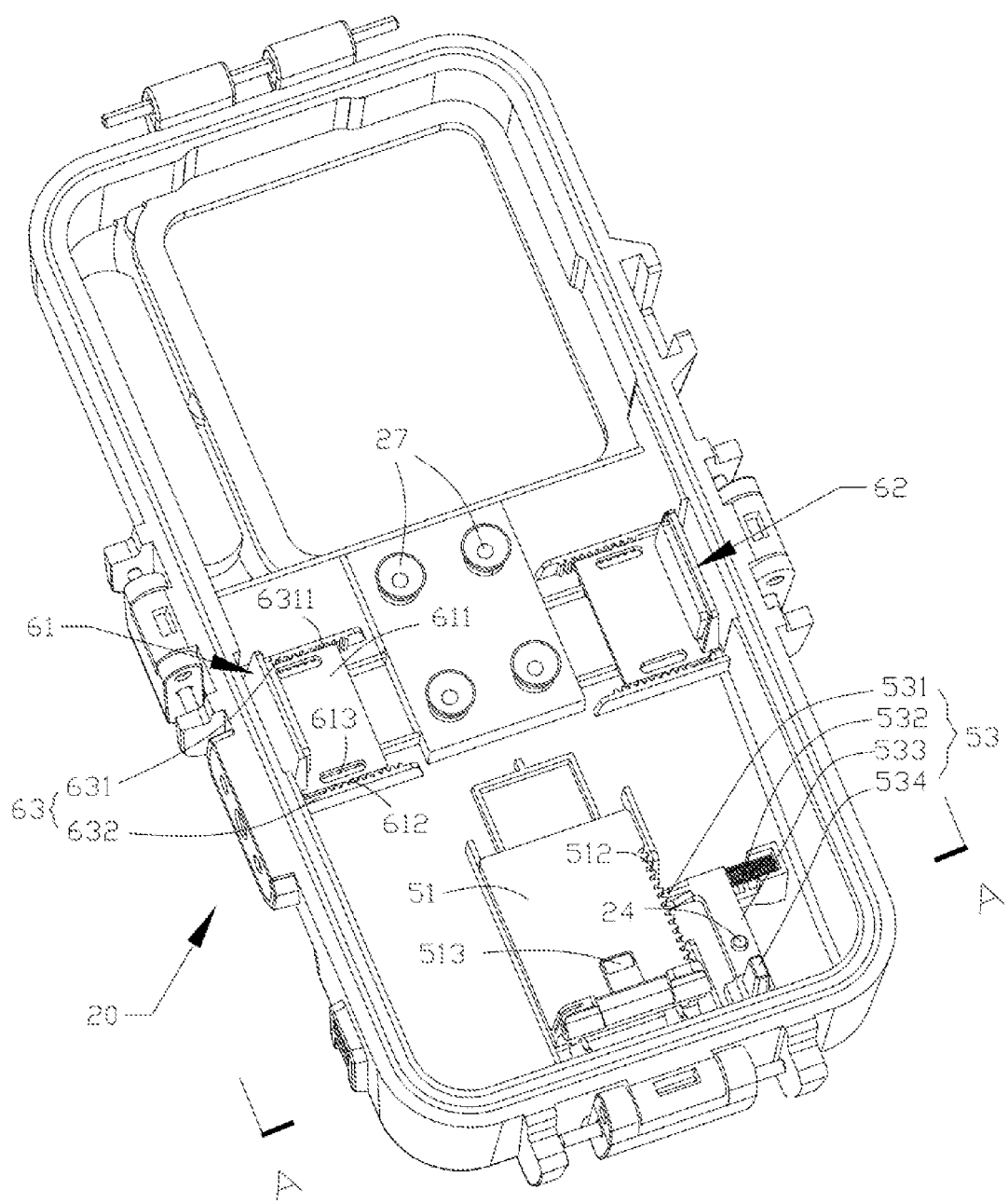
FIG. 5 is a structural schematic diagram of the lower hosing according to one embodiment of the present disclosure.

As shown in FIG. 5, the adjusting assembly 50 further comprises a fixing component 53. The positioning plate 51 comprises first teeth 512. The fixing component 53 comprises second teeth 531 matched with the first teeth 512. The fixing component 53 is movable between an engaged position of the first teeth 512 and a disengaged position of the first teeth 512. When in the engaged position of the first teeth, the positioning plate 51 is not movable. When in the disengaged position of the first teeth, the positioning plate 51 is movable. Thus, the user is able to adjust the positioning plate 51 and put the mobile terminal of different models into the accommodating cavity. The rear camera of the mobile terminal of different models directly face the shooting window while the shooting control buttons 12 directly face the virtual shooting buttons.

Specifically, a rotating shaft 24 is arranged on the lower shell 20. The fixing component 53 is rotatable with the rotating shaft 24 as a rotating center. The fixing component 53 comprises a rotating portion 533, an elastic portion 532, and a toggling portion 534. The second teeth 531 are arranged on a first end of the rotating portion 533. A first end of the elastic portion 532 abuts against the rotating portion 533 arranged opposite to the second teeth 531. A second end of the elastic portion 532 abuts against the lower shell 20. The toggling portion 534 is arranged on a second end of the rotating portion 533 and opposite to the second teeth 531. When the toggling portion 534 is toggled, the rotating portion 533 rotates with the rotating shaft 24 as the rotation center to make the second teeth 531 in the disengaged position. The elastic portion 532 may be a spring or a silicone elastic sheet.

A plug 513 is hinged to the positioning plate 51. The plug 513 is inserted into a charging port of the mobile terminal. Specifically, the plug 513 is movable between a position perpendicular to the positioning plate 51 and a position parallel to the positioning plate 51. When the positioning plate 51 is adjusted to a specified position according to the model of the mobile terminal, the plug 513 is inserted into the charging port of the mobile terminal to realize the positioning of the positioning plate 51 in the second direction of the mobile terminal, and cooperates with the clamping assembly 60 to further fix the mobile terminal, so that the mobile terminal is stably clamped in the accommodating cavity.

In one embodiment, rack rail assemblies 63 are arranged on a bottom portion of the accommodating cavity. The rack rail assemblies comprise first rack rails 631 and second rack rails 632. Rack grooves of the first rack rails 631 are opposite to rack grooves of the second rack rails 632. The clamping assembly 60 comprises a first clamping piece 61 and a second clamping piece 62. The first clamping piece 61 is arranged opposite to the second clamping piece 62. Both of the first clamping piece 61 and the second clamping piece 62 comprise a limiting plate 611. Third teeth 612 are arranged on opposite sides of each limiting plate 611 corresponding to a corresponding first rack rail 6131 and a corresponding second rack rail 632. The third teeth 612 of each limiting plate 611 are slidably engaged with the corresponding first rack rail 631 and the corresponding second rack rail 632.

Elastic grooves 613 are provided on each limiting plate 611 along a sliding direction of the first clamping piece 61 or a sliding direction of the second clamping piece 62. The elastic grooves 613 of each limiting plate 611 face corresponding third teeth 612. When the third teeth 612 of each limiting plate 611 change engaged positions between the corresponding first rack rail 631 and the corresponding second rack rail 632, the third teeth 612 of each limiting plate 611 elastically contract toward directions away from the corresponding first rack rail 631 and the corresponding second rack rail 632 under action of corresponding elastic grooves 613. Therefore, the first clamping piece 61 and the second clamping piece 62 are moved relative to each other by the limiting plates 611 to realize the clamping of two relatively long sides of the mobile terminal. The mobile terminal has different models and therefore has different sizes.

In another embodiment, the clamping assembly 60 comprises a tension spring (not shown in the drawings), a first clamping piece 61, and a second clamping piece 62. The first clamping piece 61 is arranged opposite to the second clamping piece 62. The first clamping member and the second clamping member; two ends of the tension spring are respectively connected with the first clamping piece 61 and the second clamping piece 62. Under action of the tension spring, the first clamping piece 61 and the second clamping piece 62 are elastically connected. When the mobile terminal is placed between the first clamping piece 61 and the second clamping piece 62, under the action of the tension spring, the first clamping piece 61 and the second clamping piece 62 move toward each other, thereby clamping the mobile terminal.

Figure 6:
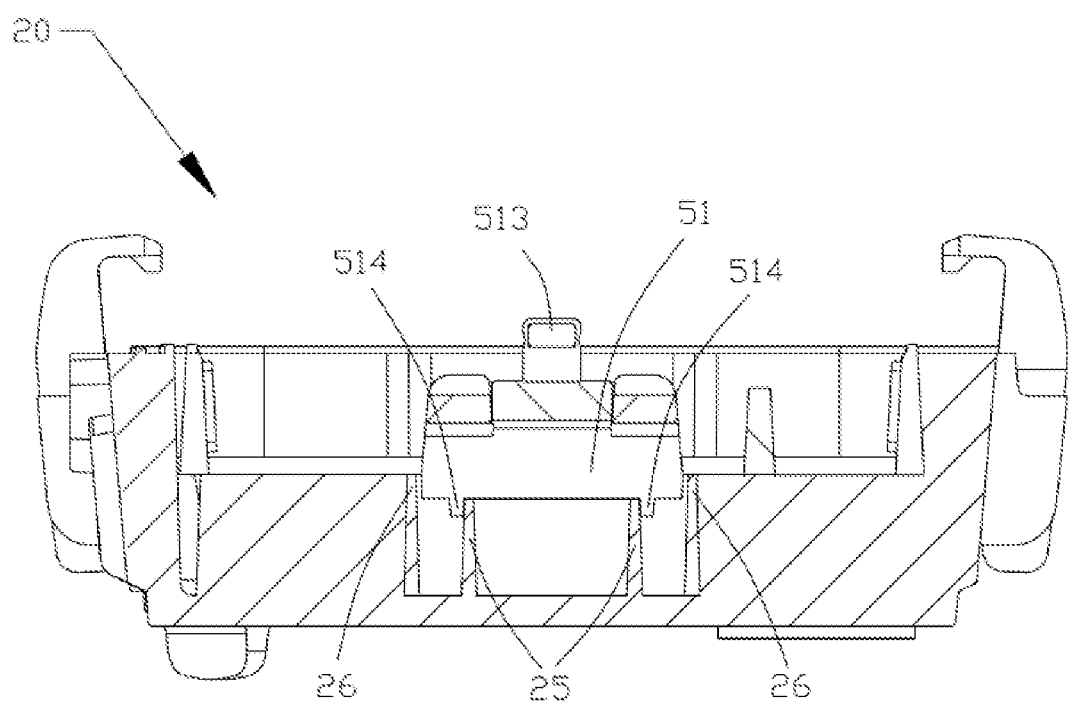
FIG. 6 is a cross-sectional view taken along a line A-A shown in FIG. 5.

As shown in FIG. 6, along the sliding direction of the positioning plate 51, two limiting blocks 514 are defined on a bottom portion of the positioning plate 51. The two limiting blocks are parallel to each other. Two limit support plates 25 are arranged on an inner surface of the lower shell 20. The two limit support plates are parallel to each other. The positioning plate 51 is slidably arranged on the two limit support plates 25. The two limiting blocks 514 are arranged between the two limit support plates 25 or the two limit support plates 25 are arranged between the two limiting blocks 514, so the positioning plate 51 slides forward or backward under support of the limit support plate 25 without deviation.

In order to further ensure that the positioning plate 51 does not deviate during a sliding process, the inner surface of the lower shell 20 further comprises two limit baffles 26. The two limit baffles 26 are parallel to each other and limit the positioning plate 51 from two sides of the positioning plate 51.

A plurality of suction cups 27 are arranged on a bottom portion of the accommodating cavity. The suction cups 27 are arranged in an array, and each of the suction cups 27 comprise a suction end (not shown). Each suction end faces the upper shell 10. When the user put the mobile terminal in the mobile terminal protective case, each suction end sucks a rear side of the mobile terminal, and effectively improve the fixing effect of the mobile terminal with cooperation of the clamping assembly 60. Moreover, setting of the suction cups 27 also plays a certain buffering effect, which effectively prevents the mobile terminal from colliding with an interior of the mobile terminal protective case when the mobile terminal is accommodated in the mobile terminal protective case and falls accidentally, and prevent damage to the mobile terminal.

Figure 7:
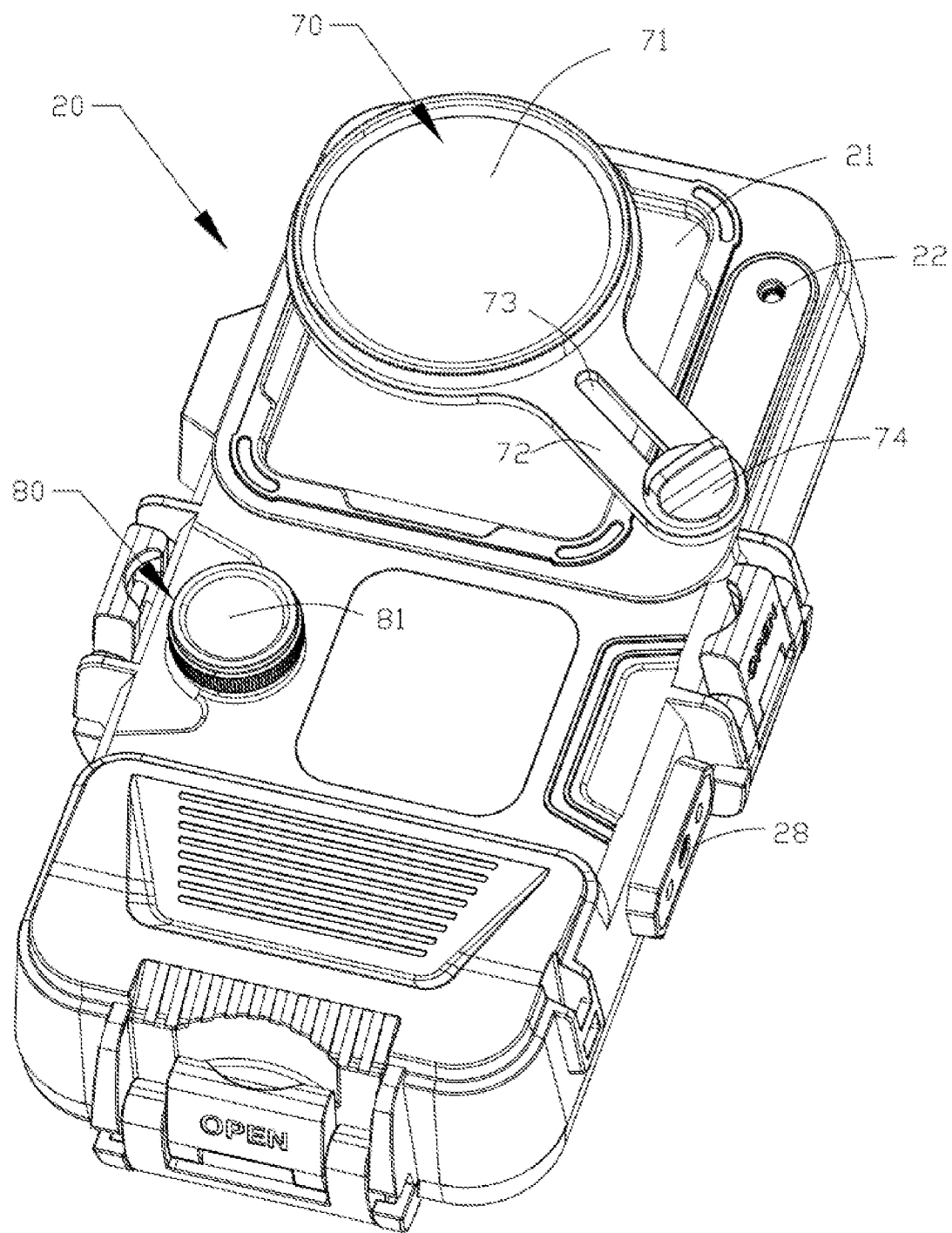
FIG. 7 is another schematic diagram of the lower hosing according to one embodiment of the present disclosure.

As shown in FIG. 7, the mobile terminal protective case further comprises a filter assembly 70. The filter assembly comprises a filter 71. A plurality of mounting holes 22 are on a rear side of the lower shell 20. The filter 71 comprises a mounting portion 72. An elongated hole 73 is on the mounting portion 72. The mounting portion 72 is adjustably mounted on any of the plurality of mounting holes 22 through the elongated hole 73 to make the filter 71 directly facing the rear camera of the mobile terminal.

Specifically, a screw 74 passes through the elongated hole 73 on the mounting portion 72 and locked into one of the plurality of mounting holes 22, so that the filter 71 adjustably faces the shooting window 21, which allows the user to take good shots through the filter 71.

The mobile terminal protective case further comprises a vacuuming assembly 80. The vacuuming assembly 80 comprises a one-way valve (not shown) and a sealing cover 81. The one-way valve is in communicated with the accommodating cavity, and the sealing cover 81 is covered on the one-way valve. When the mobile terminal is received in the accommodating cavity and the upper shell 10 and the lower shell 20 are buckled and closed by the buckles 30, a vacuum device is connected with the one-way valve to evacuates the accommodating cavity so that the accommodating cavity is in a vacuum state, which makes the upper shell 10 and the lower shell 20 to be more closely connected, and further improve the waterproof effect of the mobile terminal protective case.

The mobile terminal protective case further comprises a handle connecting hole 28 defined on one side of the mobile terminal protective case. The user can connect a handle with the mobile terminal protective case through the handle connecting hole 28, which is convenient for the user to shoot more stably underwater.

It should be noted that in the present disclosure, the mobile terminal has different models means that the mobile terminal has different shapes and sizes.

A usage method is as follows: the user positions the mobile terminal through the positioning plate 51, fixes the mobile terminal through the clamping assembly 60 and the suction cups 27, and then close and lock the upper shell 10 with the lower shell 20 through the buckles 30. Then the user evacuates the accommodating cavity through the one-way valve. Finally, the user is able to trigger the virtual shooting buttons by pressing the shooting control buttons 12 to switch between different types of shooting modes, and to switch and shoot between using the front camera and using the rear camera.

In the specification and claims of the present disclosure, terms "include/comprise" and terms "have/contain" and their variants are used to designate existence of stated features, values, steps or components, but do not exclude the existence or addition of one or multiple other features, values, steps, components, or combinations thereof.

For clarity of explanation, some features of the present disclosure are described in different embodiments. However, these features can also be combined and described in a single embodiment. Moreover, some features of the present disclosure are only described in a single embodiment for the sake of brevity. However, these features can also be described in different embodiments separately or in any suitable combination.

Foregoing descriptions are only optional embodiments of the present disclosure and are not intended to limit the present disclosure. Any modification, equivalent replacement, or improvement within the technical scope of the present disclosure should be included in the protection scope of the present disclosure.

What is claimed is:

1. A mobile terminal protective case, comprising:
   a shell;
   a clamping assembly; and
   a positioning plate;
   wherein the shell comprises an upper shell and a lower shell; the upper shell and the lower shell are closed together to form an accommodating cavity; the accommodating cavity is sealed and is configured to accommodate a mobile terminal; shooting control buttons are arranged on the upper shell; the shooting control buttons are configured to trigger virtual shooting buttons of the mobile terminal; a shooting window is on the lower shell;
   wherein the clamping assembly is arranged in the accommodating cavity; the clamping assembly clamps two opposite sides of the mobile terminal from a first direction;
   wherein the positioning plate is movably arranged in the accommodating cavity; the positioning plate is configured as a positioning substrate for the mobile terminal in a second direction, so when the mobile terminal having different models is clamped by the clamping assembly, the virtual shooting buttons directly face the shooting control buttons and a rear camera of the mobile terminal faces the shooting window; the first direction is different with the second direction;
   wherein mobile terminal protective case further comprises a fixing component; the positioning plate comprises first teeth; the fixing component comprises second teeth matched with the first teeth; the fixing component is movable between an engaged position of the first teeth and a disengaged position of the first teeth; when in the engaged position of the first teeth, the positioning plate is not movable; when in the disengaged position of the first teeth, the positioning plate is movable.

2. The mobile terminal protective case according to claim 1, wherein a plug is hinged to the positioning plate; the plug is inserted into a charging port of the mobile terminal.

3. The mobile terminal protective case according to claim 1, wherein a rotating shaft is arranged on the lower shell; the fixing component is rotatable with the rotating shaft as a rotating center; the fixing component comprises a rotating portion, an elastic portion, and a toggling portion; the second teeth are connected with a first end of the rotating portion; the elastic portion is connected with the rotating portion arranged opposite to the second teeth; the toggling portion is arranged on a second end of the rotating portion; when the toggling portion is toggled, the rotating portion rotates with the rotating shaft as the rotation center to make the first teeth in the disengaged position.

4. The mobile terminal protective case according to claim 1, wherein rack rail assemblies are arranged on a bottom portion of the accommodating cavity; the rack rail assemblies comprise first rack rails and second rack rails; rack grooves of the first rack rails are opposite to rack grooves of the second rack rails; the clamping assembly comprises a first clamping piece and a second clamping piece; the first clamping piece is arranged opposite to the second clamping piece; both of the first clamping piece and the second clamping piece comprise a limiting plate; third teeth are arranged on opposite sides of each limiting plate corresponding to a corresponding first rack rail and a corresponding second rack rail; the third teeth of each limiting plate are slidably engaged with the corresponding first rack rail and the corresponding second rack rail.

5. The mobile terminal protective case according to claim 4, wherein elastic grooves are provided on each limiting plate along a sliding direction of the first clamping piece or a sliding direction of the second clamping piece; the elastic grooves of each limiting plate face corresponding third teeth; when the third teeth of each limiting plate change engaged positions between the corresponding first rack rail and the corresponding second rack rail, the third teeth of each limiting plate elastically contract toward directions away from the corresponding first rack rail and the corresponding second rack rail under action of corresponding elastic grooves.

6. The mobile terminal protective case according to claim 1, wherein the clamping assembly comprises a tension spring, a first clamping piece, and a second clamping piece; the first clamping piece is arranged opposite to the second clamping piece; two ends of the tension spring are respectively connected with the first clamping piece and the second clamping piece.

7. The mobile terminal protective case according to claim 1, wherein a plurality of reference lines separately corresponding to the positioning plates are provided on a bottom plate of the lower shell; each of the plurality of reference lines corresponds to a model of the mobile terminal.

8. The mobile terminal protective case according to claim 1, wherein a plurality of suction cups are arranged on a bottom portion of the accommodating cavity; the suction cups are configured to suck the mobile terminal.

9. The mobile terminal protective case according to claim 1, wherein the mobile terminal protective case further comprises a filter; a plurality of mounting holes are on a rear side of the lower shell; the filter comprises a mounting portion, an elongated hole is on the mounting portion; the mounting portion is adjustably mounted on one of the plurality of mounting holes through the elongated hole to make the filter directly facing the rear camera of the mobile terminal.

10. The mobile terminal protective case according to claim 1, wherein the shooting control buttons comprise a shooting button, a first switching button, a second switching button, and a third switching button; the shooting button is configured to control photographing or video shooting; the first switching button is configured to switch a shooting mode from a left direction; the second switching button is configured to switch the shooting mode from a right direction; the third switching button is configured to switch between using a front camera and using the rear camera.

11. A mobile terminal protective case, comprising:
a shell;
a clamping assembly; and
a positioning plate;
wherein the shell comprises an upper shell and a lower shell; the upper shell and the lower shell are closed together to form an accommodating cavity; the accommodating cavity is sealed and is configured to accommodate a mobile terminal; shooting control buttons are arranged on the upper shell; the shooting control buttons are configured to trigger virtual shooting buttons of the mobile terminal; a shooting window is on the lower shell;
wherein the clamping assembly is arranged in the accommodating cavity; the clamping assembly clamps two opposite sides of the mobile terminal from a first direction;
wherein the positioning plate is movably arranged in the accommodating cavity; the positioning plate is configured as a positioning substrate for the mobile terminal in a second direction, so when the mobile terminal having different models is clamped by the clamping assembly, the virtual shooting buttons directly face the shooting control buttons and a rear camera of the mobile terminal faces the shooting window; the first direction is different with the second direction;
wherein rack rail assemblies are arranged on a bottom portion of the accommodating cavity; the rack rail assemblies comprise first rack rails and second rack rails; rack grooves of the first rack rails are opposite to rack grooves of the second rack rails; the clamping assembly comprises a first clamping piece and a second clamping piece; the first clamping piece is arranged opposite to the second clamping piece; both of the first clamping piece and the second clamping piece comprise a limiting plate; third teeth are arranged on opposite sides of each limiting plate corresponding to a corresponding first rack rail and a corresponding second rack rail; the third teeth of each limiting plate are slidably engaged with the corresponding first rack rail and the corresponding second rack rail.

12. A mobile terminal protective case, comprising:
a shell;
a clamping assembly; and
a positioning plate;
wherein the shell comprises an upper shell and a lower shell; the upper shell and the lower shell are closed together to form an accommodating cavity; the accommodating cavity is sealed and is configured to accommodate a mobile terminal; shooting control buttons are arranged on the upper shell; the shooting control buttons are configured to trigger virtual shooting buttons of the mobile terminal; a shooting window is on the lower shell;
wherein the clamping assembly is arranged in the accommodating cavity; the clamping assembly clamps two opposite sides of the mobile terminal from a first direction;
wherein the positioning plate is movably arranged in the accommodating cavity; the positioning plate is configured as a positioning substrate for the mobile terminal in a second direction, so when the mobile terminal having different models is clamped by the clamping assembly, the virtual shooting buttons directly face the shooting control buttons and a rear camera of the mobile terminal faces the shooting window; the first direction is different with the second direction;
wherein the mobile terminal protective case further comprises a filter; a plurality of mounting holes are on a rear side of the lower shell; the filter comprises a mounting portion, an elongated hole is on the mounting portion; the mounting portion is adjustably mounted on one of the plurality of mounting holes through the elongated hole to make the filter directly facing the rear camera of the mobile terminal.

\* \* \* \* \*